United States Patent
Allan

(10) Patent No.: US 9,187,365 B2
(45) Date of Patent: Nov. 17, 2015

(54) METHODS FOR MEASURING THE ASYMMETRY OF A GLASS-SHEET MANUFACTURING PROCESS

(71) Applicant: CORNING INCORPORATED, Corning, NY (US)

(72) Inventor: Douglas Clippinger Allan, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 80 days.

(21) Appl. No.: 14/170,023

(22) Filed: Jan. 31, 2014

(65) Prior Publication Data

US 2014/0242390 A1 Aug. 28, 2014

Related U.S. Application Data

(60) Provisional application No. 61/768,822, filed on Feb. 25, 2013.

(51) Int. Cl.
*G01B 21/32* (2006.01)
*C03C 21/00* (2006.01)
*G01B 21/20* (2006.01)
*C03B 17/06* (2006.01)

(52) U.S. Cl.
CPC ............. *C03C 21/001* (2013.01); *G01B 21/20* (2013.01); *G01B 21/32* (2013.01); *Y10T 428/315* (2015.01)

(58) Field of Classification Search
CPC .... C03C 21/005; C03C 21/00; C03C 21/001; C03C 21/007; C03C 23/0055; C03C 21/003; C03C 25/6286; C03B 18/04; C03B 18/18; C03B 18/02; C03B 18/14; C03B 18/22
See application file for complete search history.

(56) References Cited

U.S. PATENT DOCUMENTS

| | | | | |
|---|---|---|---|---|
| 4,671,814 A | * | 6/1987 | Aratani | ................... C03C 21/00 428/410 |
| 4,859,636 A | | 8/1989 | Aratani et al. | |
| 5,062,688 A | * | 11/1991 | Okuda | ................. G02B 3/0012 359/619 |
| 5,654,057 A | | 8/1997 | Kitayama et al. | |

(Continued)

FOREIGN PATENT DOCUMENTS

| | | |
|---|---|---|
| JP | 11322374 | 11/1999 |
| JP | 2000-264681 | 9/2000 |

(Continued)

OTHER PUBLICATIONS

Patent Abstract of JP2000-264681.

(Continued)

*Primary Examiner* — Jodi C Franklin
(74) *Attorney, Agent, or Firm* — Timothy M. Schaeberle

(57) ABSTRACT

Methods are provided for measuring the asymmetry of glass-sheet manufacturing processes. The methods include subjecting glass sheets or test samples taken from glass sheets to an ion-exchange process and measuring warp values. Metrics for the asymmetry of the glass-sheet manufacturing process are then obtained from the warp values. In one embodiment, the metric is independent of the geometry of the glass sheets or the test samples (the $BM_1$ metric); in another embodiment, the metric is independent of the geometry of the glass sheets or the test samples and substantially independent of the ion-exchange process used in the testing (the ASYM metric).

15 Claims, 2 Drawing Sheets

(56) References Cited

U.S. PATENT DOCUMENTS

| | | | |
|---|---|---|---|
| 6,329,035 B1 * | 12/2001 | Iwasaki | G11B 23/40 428/64.1 |
| 6,616,025 B1 | 9/2003 | Andrewlavage, Jr. | |
| 7,015,161 B2 | 3/2006 | Zou | |
| 7,225,665 B2 | 6/2007 | Goforth et al. | |
| 7,895,861 B2 | 3/2011 | Chalk et al. | |
| 8,113,015 B2 | 2/2012 | Burdette | |
| 2002/0135281 A1 * | 9/2002 | Goda | C03C 17/007 313/112 |
| 2006/0042314 A1 | 3/2006 | Abbott, III et al. | |
| 2007/0028681 A1 | 2/2007 | Goforth et al. | |
| 2007/0095108 A1 | 5/2007 | Kirby et al. | |
| 2008/0131651 A1 | 6/2008 | Burdette et al. | |
| 2009/0004366 A1 * | 1/2009 | Onoda | C03C 3/066 427/77 |
| 2010/0009154 A1 | 1/2010 | Allan et al. | |
| 2010/0028607 A1 | 2/2010 | Lee et al. | |
| 2010/0043495 A1 | 2/2010 | Kirby et al. | |
| 2010/0119846 A1 * | 5/2010 | Sawada | C03B 33/023 428/426 |
| 2011/0159321 A1 | 6/2011 | Eda et al. | |
| 2012/0052275 A1 | 3/2012 | Hashimoto et al. | |
| 2012/0134025 A1 | 5/2012 | Hart | |
| 2012/0196110 A1 | 8/2012 | Murata et al. | |
| 2013/0115422 A1 * | 5/2013 | Murata | C03C 3/085 428/141 |
| 2013/0295366 A1 * | 11/2013 | Murata | C03C 3/093 428/220 |
| 2014/0102144 A1 * | 4/2014 | Yamanaka | C03B 18/02 65/30.14 |
| 2014/0120335 A1 * | 5/2014 | Yamanaka | C03C 3/087 428/220 |
| 2014/0212649 A1 * | 7/2014 | Katayama | C03C 3/085 428/220 |
| 2014/0331716 A1 * | 11/2014 | Ahmed | C03C 21/002 65/30.14 |
| 2015/0044473 A1 * | 2/2015 | Murata | C03C 3/083 428/410 |
| 2015/0072129 A1 * | 3/2015 | Okahata | C03C 15/00 428/220 |
| 2015/0079347 A1 * | 3/2015 | Miyasaka | C03C 3/112 428/141 |
| 2015/0093581 A1 * | 4/2015 | Murata | C03C 3/083 428/410 |
| 2015/0166405 A1 * | 6/2015 | Murata | C03C 3/083 428/410 |

FOREIGN PATENT DOCUMENTS

| | | |
|---|---|---|
| JP | 200443295 | 2/2004 |
| JP | 2006324006 | 11/2006 |
| JP | 2008171502 | 7/2007 |
| JP | 2008105932 | 5/2008 |
| JP | 2008108413 | 5/2008 |
| JP | 2008198285 | 8/2008 |
| JP | 2009277347 | 11/2009 |
| JP | 2010116276 | 5/2010 |
| JP | 2010231835 | 10/2010 |
| JP | 4795614 | 8/2011 |
| JP | 4834654 | 9/2011 |
| KR | 937889 | 1/2010 |
| WO | 2011099333 | 8/2011 |
| WO | 2012005307 | 1/2012 |
| WO | 2012026290 | 3/2012 |
| WO | 2012086390 | 6/2012 |
| WO | 2012099002 | 7/2012 |
| WO | 2012131824 | 10/2012 |
| WO | 2012132309 | 10/2012 |
| WO | 2012141310 | 10/2012 |
| WO | 2012147372 | 11/2012 |
| WO | 2013005588 | 1/2013 |
| WO | 2013005608 | 1/2013 |

OTHER PUBLICATIONS

PCT/US2014/017062 Search Report.
JP4795614 Machine Translation.
JP4834654 Machine Translation.
JP11322374 Machine Translation.
JP2004043295 Machine Translation.
JP2006324006 Machine Translation.
JP2008105932 Machine Translation.
JP2008108413 Machine Translation.
JP2008171502 Machine Translation.
JP2008198285 Machine Translation.
JP2007277347 Machine Translation.
JP2010116276 Machine Translation.
JP2010231835 Machine Translation.
KR937889 Machine Translation.
WO2011009933 Machine Translation.
WO2012005307 Machine Translation.
WO2012026290 Machine Translation.
WO2012086390 Machine Translation.
WO2012099002 Machine Translation.
WO2012131824 Machine Translation.
WO2012132309 Machine Translation.
WO2012141310 Machine Translation.
WO2012147372 Machine Translation.
WO2013005588 Machine Translation.
WO2013005608 Machine Translation.

* cited by examiner

METHODS FOR MEASURING THE ASYMMETRY OF A GLASS-SHEET MANUFACTURING PROCESS This application claims the benefit of priority under 35 U.S.C. §119 of U.S. Provisional Application Ser. No. 61/768,822 filed on Feb. 25, 2013 the content of which is relied upon and incorporated herein by reference in its entirety.

FIELD

This disclosure relates to processes for manufacturing glass sheets and, in particular, to processes for manufacturing glass sheets that will subsequently be subjected to ion-exchange strengthening. Even more particularly, the disclosure relates to methods for measuring (quantifying) the asymmetry, specifically, the front/back (Z-axis) asymmetry, of such a manufacturing process. Among other things, the disclosed measuring techniques can be used to control (reduce) the magnitude of warp that glass sheets produced by the manufacturing process exhibit after undergoing ion-exchange strengthening.

DEFINITIONS

As used herein, the phrase "process for manufacturing glass sheets" and similar phrases, e.g., "glass-sheet manufacturing process," "sheet manufacturing process," "manufacturing process," etc., refer to the steps performed to convert batch materials into glass sheets, as well as any subsequent steps performed on the glass sheets prior to their being subjected to an ion-exchange process.

As used herein, the phrases "two major surfaces of a glass sheet," "front and back surfaces," "front and back sides," and "first and second sides" are used interchangeably and refer to the two surfaces of a glass sheet that have the largest areas. The phrases are used without regard to the orientation of the glass sheet relative to vertical.

As used herein, the phrase "Z-axis asymmetry" (also referred to herein as "front/back asymmetry" or simply as "asymmetry") of a process for manufacturing glass sheets refers to an asymmetry in the conditions to which the two major surfaces of the glass sheet are exposed during the manufacturing process, where the conditions are capable of affecting ion-exchange through the surfaces during an ion-exchange process (hereinafter referred to as "ion-exchange-affecting conditions"). The converse of Z-axis asymmetry is referred to herein as "Z-axis symmetry" or simply as "symmetry". A manufacturing process with perfect Z-axis symmetry (zero Z-axis asymmetry) would expose both major surfaces of the glass sheets to the identical conditions during manufacture. As discussed below, although low levels of Z-axis asymmetry are achievable in practice, zero Z-axis asymmetry is not achievable because of, among other things, random variations in process conditions, which are inevitable. As will be evident, the conditions to which a glass sheet is exposed includes, but is not limited to, the conditions to which the sheet's parent glass ribbon is exposed.

As used herein, the phrase "warp as a number" means the maximum out-of-plane displacement from highest to lowest on a glass sheet or glass sample that was nominally flat prior to ion exchange. If the sheet or sample possessed some warp prior to ion exchange, then the pre-existing warp is subtracted off to obtain the net warp resulting from ion exchange, and the numerical value of the warp, i.e., the "warp as a number" for the sheet or sample, is the net warp thus obtained. The letter "W" is used herein to represent "warp as a number."

BACKGROUND

Ion-exchanged glass sheets, also known as chemically-strengthened or ion-strengthened glass sheets, are used in a variety of applications. For example, ion-exchanged glass sheets are widely used as touch screens for hand-held consumer electronics such as smart phones and tablets. Perhaps the best-known example of an ion-exchanged glass sheet is the scratch-resistant faceplate of the iPhone® made from Corning Incorporated's Gorilla® Glass.

In broad overview, ion-exchanged glass sheets are made by forming a glass having a composition suitable for chemical strengthening into a glass ribbon from which individual glass sheets are cut, and then subjecting the glass sheets to chemical strengthening through an ion-exchange (IOX) process, e.g., a treatment in which the glass sheet is submersed in a salt bath at an elevated temperature for a predetermined period of time.

The IOX process causes ions from the salt bath, e.g., potassium ions, to diffuse into the glass while ions from the glass, e.g., sodium ions, diffuse out of the glass. Because of their different ionic radii, this exchange of ions between the glass and the salt bath results in the formation of a compressive layer at the surface of the glass which enhances the glass's mechanical properties, e.g., its surface hardness. The effects of the ion exchange process are typically characterized in terms of two parameters: (1) the depth of layer (DOL) produced by the process and (2) the final maximum surface compressive stress (CS). Values for these parameters are most conveniently determined using optical measurements, and commercial equipment is available for this purpose, e.g., instruments sold by Frontier Semiconductor and Orihara Industrial Company, Ltd.

Although glass sheets can be produced by a variety of glass-sheet manufacturing processes, the two main processes that are currently in commercial use to produce glass sheets that are to be subjected to an IOX process are the float process and the overflow downdraw fusion process (hereinafter referred to as the "fusion process"). The present disclosure will thus focus on these processes, it being understood that the methods for quantifying Z-axis asymmetries disclosed herein are also applicable to other glass-sheet manufacturing processes now known or subsequently developed.

In the case of the fusion process, a glass ribbon is formed by passing molten glass around the outside of a forming structure (known in the art as an "isopipe") to produce two layers of glass that fuse together at the bottom of the forming structure (the root of the isopipe) to form the glass ribbon. The glass ribbon is pulled away from the isopipe by pulling rollers and cooled as it moves vertically downward through a temperature-controlled housing. At, for example, the bottom of the housing (bottom of the draw), individual glass sheets are cut from the ribbon. In the case of the float process, a glass ribbon is formed on the surface of a molten metal bath, e.g., a molten tin bath, and after being removed from the bath is passed through an annealing lehr before being cut into individual sheets.

In both processes, the glass ribbon and/or the glass sheets cut from the ribbon are exposed to conditions that may be asymmetric with respect to the front and back sides of the glass and thus may affect the results of an ion-exchange process subsequently applied to the glass sheets. For example, the process of removing glass sheets from a glass ribbon is normally asymmetric, with scoring taking place on only one side of the ribbon followed by separation of the glass sheet by rotation in a direction which opens the score line (i.e., if the score line is formed in the front surface of the glass ribbon, then the rotation takes place towards the back surface as seen from the side of the ribbon). See, for example, Andrewlavage, Jr., U.S. Pat. No. 6,616,025.

Because sheet removal in the float process normally occurs after the ribbon has passed through an annealing lehr and because sheets are cut from the ribbon while the ribbon is supported horizontally, the conditions associated with sheet removal normally do not constitute ion-exchange-affecting conditions for the float process. However, for the fusion process, the glass ribbon hangs vertically and forces applied to the ribbon during the sheet removal process can propagate upward through the ribbon thus affecting the ribbon's position and shape at locations where, for example, the glass is passing through its glass transition temperature range. Consequently, conditions associated with sheet removal can constitute asymmetric ion-exchange-affecting conditions for the fusion process.

Various approaches have been disclosed for reducing movement of a glass ribbon and/or changes in the ribbon's shape during sheet removal in the fusion process. See, for example, Chalk et al., U.S. Pat. No. 7,895,861; Abbott, III et al., U.S. Patent Application Publication No. 2006/0042314; Kirby et al., U.S. Patent Application Publication No. 2007/0095108; and Kirby et al., U.S. Patent Application Publication No. 2010/0043495. Moreover, in some situations, especially when dealing with thin and/or wide glass ribbons, it may be desirable to intentionally introduce a bow into the glass ribbon. See, for example, Burdette et al., U.S. Patent Application Publication No. 2008/0131651; and Burdette, U.S. Pat. No. 8,113,015. Such bowing can cause the concave and convex sides of the ribbon to experience somewhat different thermal conditions as the ribbon moves through the fusion draw machine. Such different thermal histories for the two major surfaces of a glass sheet can constitute asymmetric ion-exchange-affecting conditions for a fusion process.

As noted above, the float process does not normally suffer from asymmetries associated with sheet removal. However, the float process has a basic asymmetry that arises from the fact that only one surface of the glass ribbon contacts the molten metal bath. This asymmetry is known to result in different ion-exchange properties for the two sides of the sheet. In particular, after undergoing an IOX process, glass sheets produced by the float process exhibit warp, with the surface that was not in contact with the molten metal bath becoming a convex surface. See, for example, U.S. Pat. No. 4,859,636.

Various process steps have been added to the basic float process so that the ion-exchange-affecting conditions for the overall glass-sheet manufacturing process are less asymmetric. For example, the above-referenced U.S. Pat. No. 4,859,636 adds the step of contacting the surface of the glass sheet that was in contact with the molten metal with a source of sodium ions prior to ion-exchange strengthening, while PCT Patent Publication No. WO 2012/005307 and U.S. Patent Application Publication No. US 2012/0196110 respectively describe plasma treating and forming a film of $SiO_2$, $TiO_2$, NESA, ITO, AR, or the like on one of the surfaces of the glass sheet prior to ion exchange strengthening. In addition to adding process steps, changes to the basic float process with or without additional process steps, have also been disclosed. See International Publication Numbers WO 2013/005588 and WO 2013/005608.

A common characteristic of the approaches used to deal with asymmetric ion-exchange-affecting conditions of a glass-sheet manufacturing process, whether it be a float process or a fusion process, has been their ad hoc nature. Put simply, other than through trial and error or complex and difficult measurements performed on glass samples (see, for example, International Publication Number WO 2013/005588), there has been no way to quantify whether a particular manufacturing process has or does not have sufficient Z-axis symmetry to be suitable for producing glass sheets that are to be subjected to an IOX process.

This is especially so when it is considered that IOX processes in and of themselves have numerous variables (e.g., time-temperature profiles, bath compositions, use of multiple ion-exchange stages each with its own time-temperature profile and bath composition, etc.). The ad hoc process is thus even more challenging when trying to determine if a particular manufacturing process or particular additions to a basic manufacturing process (e.g., the addition of a plasma treatment) will provide a sufficiently low level of Z-axis asymmetry for more than one possible IOX treatment of the glass sheets produced by the process. Along these same lines, it has not been possible to predict whether a particular manufacturing process or particular additions to a basic manufacturing process provide sufficient Z-axis symmetry to be used in producing a specified product, e.g., glass sheets having a specified size/thinness combination.

As discussed fully below, in accordance with certain of its aspects, the present disclosure addresses the above-described deficiencies in the art by providing methods for measuring (quantifying) the intrinsic (native) Z-axis asymmetry of a glass-sheet manufacturing process. The quantification is in terms of an asymmetry value, i.e., an "ASYM" value, which is a dimensionless number, or a $BM_1$ value, which has the dimensions of distance. Using either or both of these asymmetry values, comparisons can be made between a given glass-sheet manufacturing process operated under various conditions or between glass-sheet manufacturing processes of various types.

SUMMARY

In accordance with a first aspect, a method is disclosed for measuring the asymmetry of a glass-sheet manufacturing process which includes:
(I) producing a glass sheet using the glass-sheet manufacturing process;
(II) measuring the mass $M_0$ of the glass sheet or a test sample from the glass sheet;
(III) subjecting the glass sheet or the test sample to an ion-exchange process;
(IV) measuring the change in mass $\Delta M$ of the glass sheet or the test sample as a result of step (III);
(V) measuring a warp value W for the glass sheet or the test sample after step (III); and
(VI) computing an ASYM value for the glass sheet or the test sample using an equation of the form:

$$ASYM = \frac{2R^2}{3}\left(\frac{2}{L_x} + \frac{2}{L_y} + \frac{2}{L_z}\right)\frac{W}{\Delta M}\frac{2M_0(W_{in} - W_{out})}{W_{Glass}}$$

where $W_{Glass}$ is the molecular weight in grams/mole of the glass making up the glass sheet or the test sample prior to step (III), $W_{in}$ and $W_{out}$ are, respectively, the molecular weights in grams/mole of the ions being exchanged into and out of the glass in step (III), taken singly, such as K and Na, and not taken as oxides, such as $K_2O$ and $Na_2O$, R is the glass sheet's or the test sample's thickness-to-diagonal ratio, and $L_x$, $L_y$, and $L_z$ are, respectively, the length, width, and thickness of the glass sheet or the test sample in the same units as the warp value W;

where the ASYM value calculated in step (VI) is a measure of the asymmetry of the glass-sheet manufacturing process.

In accordance with a second aspect, a method is disclosed for measuring the asymmetry of a glass-sheet manufacturing process which includes:

(I) producing a glass sheet using the glass-sheet manufacturing process;

(II) subjecting the glass sheet or a test sample from the glass sheet to an ion-exchange process;

(III) measuring a warp value W for the glass sheet or the test sample after step (II); and (IV) computing a $BM_1$ value for the glass sheet or the test sample using an equation of the form:

$$BM_1 = K \cdot W \cdot R^2$$

where K is a constant (e.g., K=⅔) and R is the glass sheet's or the test sample's thickness-to-diagonal ratio;

where the $BM_1$ value calculated in step (IV) is a measure of the asymmetry of the glass-sheet manufacturing process.

The asymmetric metrics determined by the above methods (i.e., the ASYM and/or $BM_1$ values) can be used to identify glass-sheet manufacturing processes having sufficient Z-axis symmetry for use in producing particular products. For example, in accordance with an embodiment, glass-sheet manufacturing processes having ASYM values less than or equal to 1,500 ppm and/or $BM_1$ values (K=⅔) less than or equal to 0.002 microns can be used to produce ion-exchange strengthened glass sheets having R values less than or equal to $2.5 \times 10^{-4}$. The ASYM metric is particularly valuable in this regard because it is predictive of the warp that will be exhibited by ion-exchange strengthened glass sheets not only for the IOX process used in measuring the ASYM value, but also for other IOX processes applied to glass sheets of similar composition produced by the glass-sheet manufacturing process.

The above summaries of the various aspects of the disclosure are not intended to and should not be interpreted as limiting the scope of the invention. More generally, it is to be understood that both the foregoing general description and the following detailed description are merely exemplary of the invention and are intended to provide an overview or framework for understanding the nature and character of the invention.

Additional features and advantages of the invention are set forth in the detailed description which follows, and in part will be readily apparent to those skilled in the art from that description or recognized by practicing the invention as exemplified by the description herein. The accompanying drawings are included to provide a further understanding of the invention, and are incorporated in and constitute a part of this specification. It is to be understood that the various features of the invention disclosed in this specification, the drawings, and the claims can be used in any and all combinations.

DETAILED DESCRIPTION

As discussed above, the present disclosure relates to quantifying intrinsic asymmetry (Z-axis asymmetry) in the manufacture of ion-exchangeable glass which results in warping or curvature of a glass sheet as a consequence of asymmetric ion distribution through the thickness of the sheet after ion exchange. The quantification provided herein serves as a guide to the manufacture of low-warp, ion-exchangeable glass through the creation and/or maintenance of low asymmetry in the manufacturing process.

The warp resulting from performing ion exchange on a glass sheet produced by a manufacturing process having a high level of Z-axis asymmetry is more severe when the glass sheets are larger in length and width and/or when thinner. As the marketplace evolves toward larger displays that use cover glass (such as pad sizes, notebook sizes, laptop, and TV cover glass) and as the marketplace evolves toward thinner cover glass thicknesses, the problem of warping becomes aggravated.

Glass sheets that develop warp through ion exchange are difficult to handle on removal from a salt bath and difficult to transport within a manufacturing plant, as warp can cause glass sheets to touch each other or to touch parts of cassettes or transport devices with consequent damage to the glass. Thus, even if the warp in a final product might be small due to small product dimensions, when large glass sheets are being processed prior to cutting into small individual products, warp can still be a problem because it can interfere with the overall process for making the product. Processing of larger sheets is a commercial trend and thus the need to control (reduce) warp is an ever pressing problem in the art.

Figure 1:
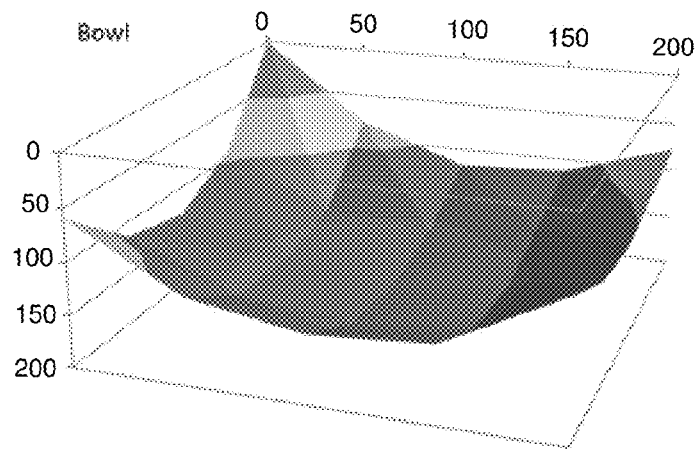
FIG. 1 is a graph illustrating the type of warp observed after ion exchange of a glass sheet (glass plate) produced by a manufacturing process, e.g., a float process, having a high level of Z-axis asymmetry.
Figure 2:
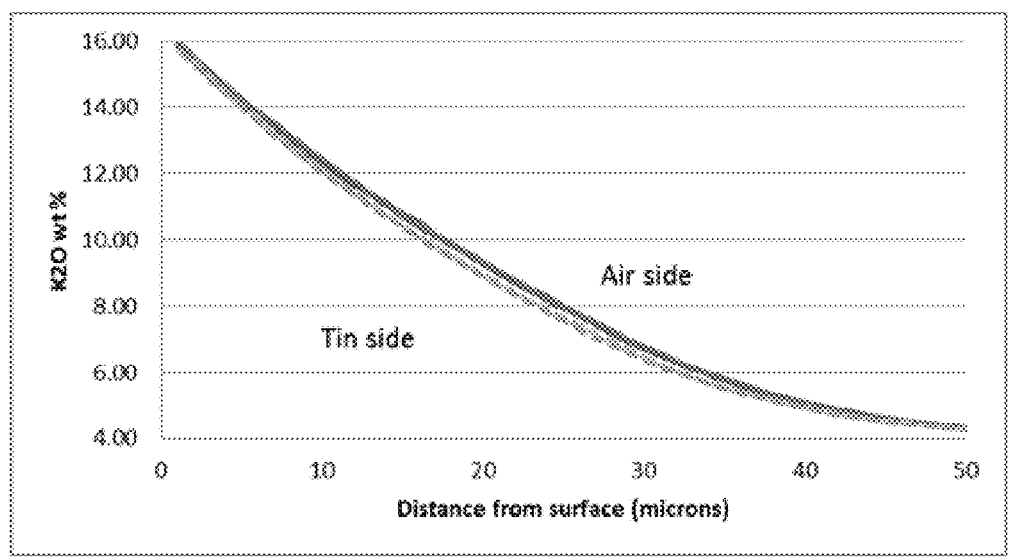
FIG. 2 is a graph showing concentration versus distance-from-surface after ion exchange for a glass sheet produced by a float process. The upper curve is for the air side of the sheet and the lower curve is for the tin side.

FIGS. 1 and 2 provide background for the analysis presented below. FIG. 1 shows an example of the warp observed for a typical glass plate produced by a manufacturing process, e.g., a float process, having a high level of Z-axis asymmetry and subsequently ion exchanged. For a float process, the sense of warp is concave towards the side of the sheet that was exposed to the molten metal bath (molten tin bath) and persists even when the metal (tin) is removed by grinding and polishing or by etching. The bowl shape seen in FIG. 1 is the shape predicted by the gravity-free analysis used in the equations presented below.

FIG. 2 shows an example of the asymmetry in potassium concentration that can be observed after Na/K ion exchange performed on a glass sheet produced by a manufacturing process having a high level of Z-axis asymmetry, specifically, in this figure, a float process. As can be seen, the difference in ion penetration is rather small, i.e., about 1 micron, with the air side of the glass sheet exhibiting a slightly greater diffusivity. The non-zero asymmetry seen in FIG. 2 creates a non-zero value for the intrinsic asymmetry integral of Eq. (1) discussed below.

It should be noted that the asymmetry shown in FIG. 2 is not always detectable even when warp in a full size sheet is clearly present. This is so because the magnitude of the asymmetry in concentration can be so small that it is nearly within the noise of the measurement. A benefit of the quantification (measurement) techniques of the present disclosure is that they do not depend on the direct measurement of such small concentration differences, but rather employ warp and overall weight change measurements that can be readily and accurately performed using commonly-available laboratory equipment. These easily-performed measurements are in direct comparison to the complex measurement techniques used in, for example, the above-referenced International Publication Number WO 2013/005588.

With the foregoing as background, we now turn to the problem of identifying and quantifying asymmetries of physical properties that give rise to warp after ion exchange. To simplify the analysis, we focus on nominally flat glass sheets of rectangular shape and uniform thickness, it being understood that the processing of other shapes can also have trouble with systematic warp from ion exchange.

The asymmetry of interest is intrinsic (native) asymmetry of physical properties through the thickness dimension of the glass sheet as a result of Z-axis asymmetries in the glass-sheet manufacturing process. We identify two main sources of warp from asymmetric physical properties: (1) asymmetry of the diffusivity (such as can arise from asymmetry of the thermal history of the glass) and (2) asymmetry of the surface chemistry of the glass. The former influences how far and how many ions enter each surface during ion exchange, while the latter affects both how many ions enter and the magnitude of exchanged ion concentration at each surface. Warp results when either or both of these quantities are asymmetric. Other sources of asymmetry of physical properties, such as asymmetry of lattice dilation coefficient (discussed below), asymmetry of Young's modulus, or asymmetry of the Poisson ratio, are also included as these also induce warp during ion exchange.

We denote the concentration of the exchanged ion (e.g., the concentration of $K_2O$ that replaces $Na_2O$ in a K/Na ion exchange) by $C(z)$ where z is the dimension through the thickness. This can be expressed in concentration units such as mole %. In accordance with an embodiment, we represent the intrinsic asymmetry by a concentration integral of the following form, which can be thought of as a "bending moment per unit length" concentration integral in view of the multiplication of the concentration difference by z:

$$M_1 = \frac{1}{L_z} \int_{-L_z/2}^{L_z/2} (C(z) - C_{base}) z \, dz \quad (1)$$

In this expression $L_z$ is the thickness of the glass sheet, $C(z)$ is the concentration of the larger ion after ion exchange, and $C_{base}$ is the concentration of the larger ion in the base glass prior to ion exchange. The bottom surface is at $z=-L_z/2$ and the top surface is at $z=L_z/2$. The $M_1$ integral has dimensions of mole % times distance. Thus, the $M_1$ intrinsic asymmetry value can be thought of as a measure of the asymmetry of the concentration through the thickness times the asymmetry of the ion penetration depth through the thickness, giving rise to concentration times thickness. This integral would be zero if the concentration profile were perfectly symmetric because the value of z would take on equal but opposite values between the center and each respective surface while the concentrations above baseline would be the same.

We denote the top and bottom surface concentration values above baseline by:

$$\Delta C_t = C_{surf,t} - C_{base} \quad (2)$$

and $$\Delta C_b = C_{surf,b} - C_{base} \quad (3)$$

These two values may or may not be identical; when they differ they constitute another source of intrinsic asymmetry of the glass sheet. This intrinsic asymmetry is only revealed by performing ion exchange but it is intrinsic to the glass because the surface concentration is the result of a dynamic equilibrium between the salt bath and the glass, so when the two surfaces reach a different equilibrium it reflects a fundamental difference of the glasses near the top and bottom surfaces.

We denote the surface compressive stress, as measured by, for example, a FSM instrument such as that manufactured by Orihara Industrial Company, by CS. Since this will differ on the top and bottom surfaces in the presence of intrinsic asymmetry, we denote the top and bottom surface values by $CS_t$ and $CS_b$ respectively. As shown below, a surprisingly small difference in CS values can give rise to substantial warp. Because small differences are difficult to determine accurately, in accordance with the present disclosure, intrinsic asymmetry is quantified using a warp measurement rather than by trying to measure a difference in CS.

In accordance with the present disclosure, the difference in CS from the top to bottom surfaces, where each is taken as a positive number representing the magnitude of compressive stress, is related to the $M_1$ intrinsic asymmetry value by the following equation:

$$CS_t - CS_b = \frac{BE}{1-v}\left[\Delta C_t - \Delta C_b - \frac{12 M_1}{L_z}\right] \quad (4)$$

In Eq. (4), B represents the "lattice dilation coefficient", E is Young's modulus, $v$ is the Poisson ratio of the glass, and $L_z$ is again the glass thickness. As used herein, the lattice dilation coefficient is defined as a coefficient that converts concentration above baseline into strain, i.e., $B\Delta C_t$ gives the ion exchange-induced free strain on the top surface and $B\Delta C_b$ gives the ion exchange-induced free strain on the bottom surface. As shown in Eq. (4), when these differ, their difference contributes directly to a difference in CS between top and bottom surfaces.

The other term in Eq. (4) involves the bending moment integral of Eq. (1), i.e., the $M_1$ asymmetry value. When more ions enter say the top surface than the bottom surface, then $M_1>0$. This contributes to $CS_b$ being larger than $CS_t$ from Eq. (4). Physically, added strain in the top half of a glass plate bends the plate in a concave sense toward the bottom half; this introduces increased compressive stress (higher $CS_b$) on the bottom surface and reduced compressive stress (lower $CS_t$) on the top surface. Thus warp and differences in CS are correlated.

Using the above definition of warp as a number, the overall warp W in terms of the bending moment integral $M_1$ can be written as:

$$W = -\frac{6}{L_z^2}\left(\left(\frac{L_x}{2}\right)^2 + \left(\frac{L_y}{2}\right)^2\right) B M_1 \quad (5)$$

where the sheet length and width are $L_x$ and $L_y$, the thickness is still $L_z$, and B is again the lattice dilation coefficient.

Because $M_1$ has units of concentration times distance, $BM_1$ is dimensionless strain times distance, so overall W has the dimension of distance as it should. Like $M_1$, $BM_1$ constitutes an intrinsic asymmetry value in accordance with the present disclosure.

Figure 3:
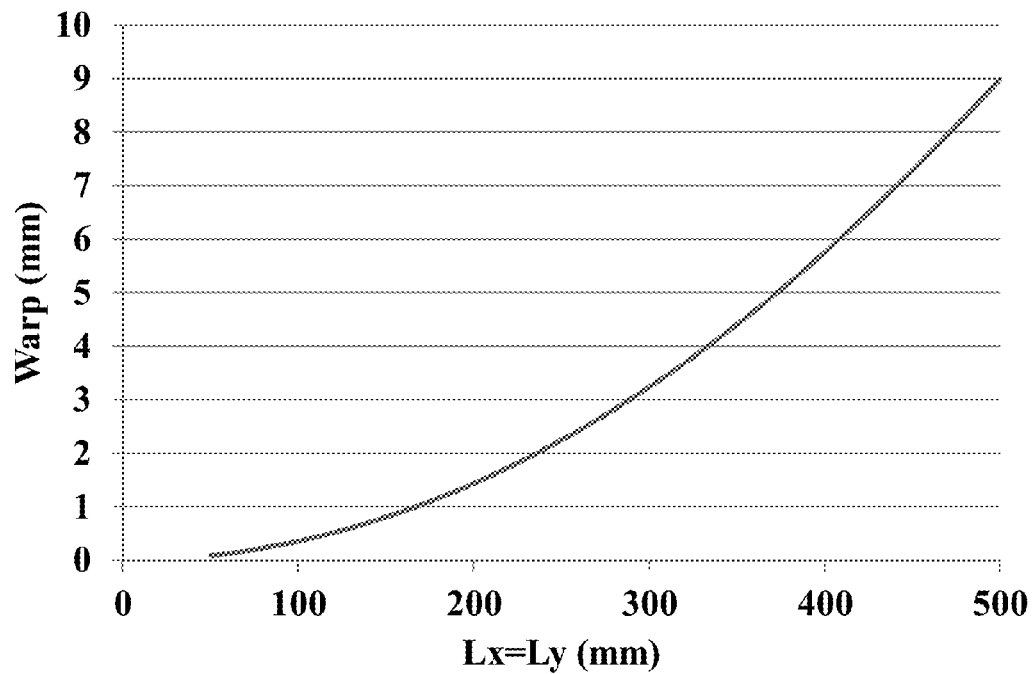
FIG. 3 is a plot of warp in millimeters predicted by Eq. (5) for a representative $BM_1$ value of 0.003 microns and a sheet thickness of 0.5 mm.
Figure 4:
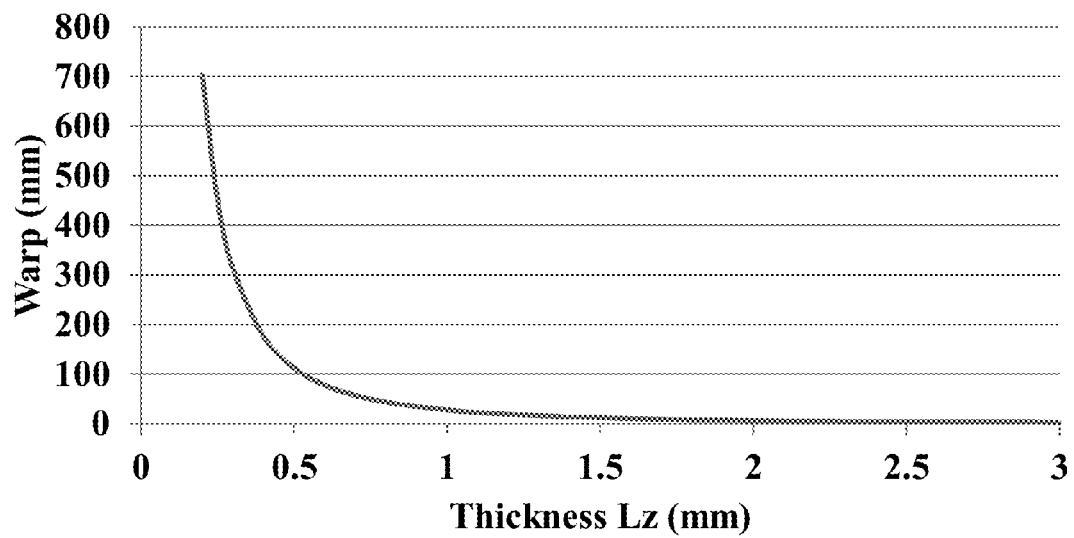
FIG. 4 is a plot of warp in millimeters predicted by Eq. (5) for a representative $BM_1$ value of 0.003 microns and a sheet size of 2000 mm×1500 mm.

As can be seen from Eq. (5), for a given intrinsic asymmetry expressed as a $M_1$ value or a $BM_1$ value, the warp is worse for a larger sheet size (larger $L_x$ and/or $L_y$ value) and for a thinner sheet (smaller $L_z$ value). FIGS. 3 and 4 illustrate the rapid rise in gravity-free warp values with sheet size and sheet thickness as predicted by Eq. (5) for a $BM_1$ value of 0.003 microns, a typical value for a float process. In FIG. 3, sheet thickness is held constant at 0.5 mm, while in FIG. 4, sheet size is held fixed at 2000 mm×1500 mm. Table 1 tabulates typical warp values for a few representative sheets sizes and thicknesses. The connection between (1) sheet size and thickness and (2) resulting warp that is illustrated in these figures and table is critical for controlling warp for larger and thinner parts.

To simplify the analysis, the warp of Eq. (5) is gravity-free warp. Gravity will tend to flatten a warped glass sheet that is laid out horizontally but the underlying warp of the sheet is still problematic due to the possibility of edge curl or other warp-induced effects such as ripple in the sheet. As discussed below, gravity-free warp values can be obtained from warp values measured under gravity conditions by multiplying the measured value by a correction factor, e.g., by 1.13 if the warp is measured with the sheet in a dome orientation (i.e., concave down) and 1.07 if the warp is measured with the sheet in a bowl orientation (i.e., concave up), which makes the latter configuration the preferred orientation for the warp measurement.

It should be noted that when the lattice dilation coefficient is not known, Eq. (4) can be used to estimate B from an equation of the form $$B = \frac{1-v}{E} \frac{(CS_t - CS_b)}{\left[\Delta C_t - \Delta C_b - \frac{12M_1}{L_z}\right]} \tag{6}$$

This equation allows us to relate warp directly to the difference in CS values by substituting Eq. (6) in Eq. (5) to get $$W = -\frac{6}{L_z^2}\left(\left(\frac{L_x}{2}\right)^2 + \left(\frac{L_y}{2}\right)^2\right)M_1 \frac{1-v}{E} \frac{(CS_t - CS_b)}{\left[\Delta C_t - \Delta C_b - \frac{12M_1}{L_z}\right]} \tag{7}$$

When the surface concentrations are symmetric, this expression simplifies to $$W = -\frac{1}{2L_z}\left(\left(\frac{L_x}{2}\right)^2 + \left(\frac{L_y}{2}\right)^2\right)\frac{1-v}{E}(CS_t - CS_b) \tag{8}$$

This last equation is convenient because $M_1$ divides out and we have a simple way to relate CS differences to warp. To provide a specific example, we assume that the glass sheet is produced by a float glass process for which a typical observed warp after ion-exchange is approximately −0.63 mm for a part with $L_x$=182 mm, $L_y$=237 mm, and $L_z$=0.8 mm. The negative sign indicates that the warp is concave "down" or concave toward the tin side of the glass. The Young's modulus for such a glass is roughly 70 GPa and the Poisson ratio roughly 0.2.

Using these values, Eq. (8) gives an estimate for $CS_t$−$CS_b$ of 3.95 MPa. This shows that a surprisingly small difference in surface compressive stress, generally too low to measure accurately, results in a substantial degree of warp that is readily observed. From Eq. (5), we can estimate $BM_1$ for such a glass sheet to be approximately 3.0×10$^{-6}$ mm. Taking the lattice dilation coefficient to be approximately 0.001/mole %, we can then estimate $M_1$ to be approximately 0.0030 mm mole %.

In terms of average diffusivities $D_t$ and $D_b$ of the top and bottom halves of the plate, $M_1$ can be expressed by integrating an erfc-shaped concentration profile to get $$M_1 \approx \Delta C_t\left(\sqrt{\frac{D_t t}{\pi}}\right) - \Delta C_b\left(\sqrt{\frac{D_b t}{\pi}}\right) \tag{9}$$

where t is the time of diffusion. When characterizing the depth of penetration of ions using for example a FSM instrument manufactured by Orihara, this expression, when written in terms of FSM DOL values for the sheet's top and bottom surfaces, takes the form $$M_1 \approx \frac{1}{2.8\sqrt{\pi}}[\Delta C_t(DOL_t) - \Delta C_b(DOL_b)] \tag{10}$$

where $DOL_t$ is the DOL measured for the top half and $DOL_b$ is the DOL measured for the bottom half.

If the surface concentrations above baseline are the same for top and bottom, and are equal to about 12 mole %, we can estimate the difference in penetration depths DOL for the above $M_1$ value of approximately 0.0030 mm mole % to be about 1.2 μm. This is again a barely measurable difference in diffusivity or ion penetration depth, but it gives rise to readily observable warp.

The above analysis illustrates 1) the substantial amount of warp that can be observed on larger and thinner parts and 2) the difficulties associated with directly measuring the asymmetry of the physical properties that gives rise to warp after ion exchange. In view of these considerations, in accordance with the present disclosure, direct measurement of warp is used as the experimental starting point for characterizing intrinsic asymmetry of the glass-sheet manufacturing process that produced the warped glass sheet. In some cases, when intrinsic asymmetry is large enough, the integral of Eq. (1) can be evaluated using directly measured concentration profiles from, for example, an electron probe micro-analyzer (EPMA) measurement. However, even in these cases, direct experimental observation of warp is generally more sensitive.

By choosing a piece size ($L_x$,$L_y$) that is large enough and a thickness $L_z$ that is thin enough, a consistently large warp value can be observed after ion exchange when a glass manufacturing process produces glass with intrinsic asymmetry. Equation (5) is then the primary equation for transforming such measured values of warp into an asymmetry value (asymmetry metric) for the glass-sheet manufacturing process. In particular, the glass' intrinsic asymmetry (native asymmetry) as revealed by a given ion exchange process can be characterized by the $BM_1$ value of Eq. (5), independent of the length and width of a given glass plate.

Once a $BM_1$ value is known for a given glass produced by a given glass-sheet manufacturing process and a given ion exchange process (e.g., time, temperature, and salt quality), the expected gravity-free warp for any glass geometry produced by that manufacturing process can be estimated by Eq. (5) for the same or substantially the same ion exchange process. $BM_1$ is thus a valuable measure of the intrinsic (native) asymmetry of a glass-sheet manufacturing process and when coupled with a defined ion exchange process, provides a useful method for comparing sheet manufacturing processes and for tracking the effects on warp of changes to such processes.

From the above, it can be seen that the $BM_1$ metric is of the form:

$$BM_1 = K \cdot W \cdot R^2$$

where R is the ratio of the glass sheet's thickness to its diagonal given by:

$$R = \frac{L_z}{\sqrt{L_x^2 + L_y^2}} \tag{11}$$

In Eq. (5) above, K equals ⅔.

Although a single test sample can be used, the final result is normally obtained by averaging $BM_1$ values for a plurality of test samples, e.g., four or more samples. As a general guide, a $BM_1$ value (e.g., an average $BM_1$ value) less than or equal to 0.002 microns, (for example, $BM_1 \leq 0.001$ microns or $BM_1 \leq 0.0005$ microns), obtained using a commercially viable ion-exchange process and calculated for K equal to ⅔, is indicative of a glass-sheet manufacturing process that has intrinsic (native) symmetry, and thus glass sheets produced by the process can be expected not to encounter warp problems. In particular, these values are applicable to glass sheets having R values that are less than or equal to $2.5 \times 10^{-4}$ (for example, $R \leq 2.0 \times 10^{-4}$ or $R \leq 1.5 \times 10^{-4}$).

As indicated above $BM_1$ values depend on the ion exchange conditions used in the measurement process. Specifically, ion exchange conditions can make the warp more or less severe depending on the resulting surface boundary concentrations above baseline, i.e., $\Delta C_t$ and $\Delta C_b$, and the depth of penetration of the concentration profile that occurs in Eq. (1).

In accordance with a further embodiment, the effects of ion exchange conditions on the measurement of Z-axis asymmetry for a glass-sheet manufacturing process are minimized through the evaluation of the process' ASYM value. That is, while both $BM_1$ and ASYM values measure the intrinsic (native) asymmetry of a glass-sheet manufacturing process, ASYM values have the advantage of being substantially independent of ion exchange conditions, provided the ion exchange conditions are sufficient to produce ion exchange strengthening of glass sheets, i.e., although not wedded to any particular ion exchange conditions, an ASYM measurement does assume the use of ion exchange conditions that are reasonable, e.g., ion exchange conditions suitable for use commercially for the glass sheets of interest.

In general terms, an ASYM value is a normalization of a $BM_1$ value by the number of atoms exchanged. The normalization is achieved by a measurement of fractional mass difference before and after ion exchange, with the fractional mass difference being itself normalized using molecular weights and sample size. While $BM_1$ values have the units of length, e.g., microns or nanometers, ASYM values are dimensionless, e.g., of the order of a few hundred to a few thousand ppm.

In particular, in accordance with an embodiment, ASYM values are determined using an equation of the form:

$$ASYM \equiv BM_1 \left( \frac{2}{L_x} + \frac{2}{L_y} + \frac{2}{L_z} \right) \frac{M_0}{\Delta M} \frac{2(W_{in} - W_{out})}{W_{Glass}} \tag{12}$$

or upon using Eq. (5) for $BM_1$ and Eq. (11) for R:

$$ASYM = \frac{2R^2}{3} \left( \frac{2}{L_x} + \frac{2}{L_y} + \frac{2}{L_z} \right) \frac{W}{\Delta M} \frac{2M_0(W_{in} - W_{out})}{W_{Glass}} \tag{13}$$

where W, $BM_1$, $L_x$, $L_y$, and $L_z$ are as defined above and are all expressed in the same units, e.g., microns, $M_0$ is the mass of the sample (i.e., the sample whose warp was measured) just before ion exchange, $\Delta M$ is the change in sample mass as a result of the ion exchange and is obtained by using the mass just after ion exchange and cleaning minus $M_0$, $W_{Glass}$ is the molecular weight of the base glass prior to ion exchange in grams/mole, $W_{in}$ represents the molecular weight of the ion (e.g., $K^+$, not $K_2O$) being exchanged into the glass in grams/mole, and $W_{out}$ represents the molecular weight of the ion (e.g., $Na^+$, not $Na_2O$) being exchanged out of the glass in grams/mole. The molecular weight of the base glass is obtained by taking the molecular weights of the components of the glass (e.g., $SiO_2$, $Al_2O_3$, etc.), multiplying each molecular weight by the component's mole fraction in the glass, and then summing the results.

Although a single test sample can be used, the final result is normally obtained by averaging ASYM values for a plurality of test samples, e.g., four or more samples. As a general guide, an ASYM value (e.g., an average ASYM value) less than or equal to 1,500 ppm, (for example, $ASYM \leq 1,000$ ppm or $ASYM \leq 500$ ppm), obtained using a commercially viable ion-exchange process and evaluated for K equal to ⅔ in the $BM_1$ calculation if Eq. (12) is used, is indicative of a glass-sheet manufacturing process that has intrinsic (native) symmetry, and thus glass sheets produced by the process can be expected not to encounter warp problems. This is especially so for glass sheets having R values that are less than or equal to $2.5 \times 10^{-4}$ (for example, $R \leq 2.0 \times 10^{-4}$ or $R \leq 1.5 \times 10^{-4}$).

Eqs. (12) and (13) are based on the observation that the measured native asymmetry grows in proportion to the number of ions exchanged. Accordingly, normalization can be performed using the number of ions exchanged, i.e., by the fractional mass increase produced by an ion exchange process, a readily measurable value. Fractional mass increase is proportional to the average of the top and bottom depths of layer (DOLs), while the native asymmetry is proportional to the difference in the depths of layer. Since both grow with sqrt(time), there is no need to explicitly divide by sqrt(t).

Accordingly, in general terms, based on the above observation, the ASYM value can be expressed as:

$$ASYM \equiv B \frac{\Delta C_t(\sqrt{D_t t}) - \Delta C_b(\sqrt{D_b t})}{\Delta C_t(\sqrt{D_t t}) + \Delta C_b(\sqrt{D_b t})} \tag{14}$$

where $D_t$ and $D_b$ are the diffusivities for the top and bottom of the glass sheet. This equation shows how ASYM is a measure of the difference in number of ions that have crossed the two surfaces normalized by the total number of ions that have crossed the two surfaces. This equation includes the glass' lattice dilation coefficient B since larger B gives larger warp in proportion and thus plays a role in the asymmetry of strain and thus warp, but, as will now be shown, its effects are automatically included in the warp measurement and thus a value for B is not needed to evaluate ASYM.

We begin by assuming a single erfc concentration profile on each side of the glass so that warp can be expressed as $$W = -\frac{3B\sqrt{t}}{2\sqrt{\pi}}\left[\Delta C_t(\sqrt{D_t}) - \Delta C_b(\sqrt{D_b})\right]\frac{(L_x^2 + L_y^2)}{L_z^2} \quad (15)$$

We also have from Eq. (5) above $$W = -\frac{3}{2}\frac{(L_x^2 + L_y^2)}{L_z^2}BM_1 \quad (16)$$

which implies $$BM_1 = -\frac{B}{\sqrt{\pi}}\left[\Delta C_t(\sqrt{D_t t}) - \Delta C_b(\sqrt{D_b t})\right] \quad (17)$$

which corresponds to Eq. (9) above.

Again assuming a single erfc concentration profile, an analysis of mass difference during ion exchange gives the following relationship:

$$\frac{\Delta M(t)}{M_0} = \left(\frac{2}{\sqrt{\pi}}\right)\left(\frac{1}{L_x} + \frac{1}{L_y} + \frac{1}{L_z}\right)\left[\Delta C_t(\sqrt{D_t t}) + \Delta C_b(\sqrt{D_b t})\right]\left[\frac{2(W_{in} - W_{out})}{W_{Glass}}\right] \quad (18)$$

Substituting Eqs. (17) and (18) into Eq. (14) then gives Eq. (13), with the dependence on B removed and the resulting asymmetry value (asymmetry metric) normalized by the molecular weight of the glass, the masses of exchanging atoms, and the sample geometry.

To summarize, in outline, ASYM values are obtained by:

(A) Measuring fractional mass difference on a plurality of samples before and after ion exchange and calculating for each sample $$\frac{\frac{\Delta M(t)}{M_0}}{\left(\frac{2}{L_x} + \frac{2}{L_y} + \frac{2}{L_z}\right)\left[\frac{(W_{K_2O} - W_{Na_2O})}{W_{Glass}}\right]} = \left(\frac{1}{\sqrt{\pi}}\right)\left[\Delta C_t(\sqrt{D_t t}) + \Delta C_b(\sqrt{D_b t})\right] \quad (19)$$

(Note that the samples' edges may need to be polished prior to testing to avoid errors due to edge chipping.)

(B) On the same samples, measuring warp magnitudes W, including correction for gravity, and calculate for each sample $$BM_1 = \frac{2}{3}\frac{L_z^2}{(L_x^2 + L_y^2)}W = \frac{B}{\sqrt{\pi}}\left[\Delta C_t(\sqrt{D_t t}) - \Delta C_b(\sqrt{D_b t})\right] \quad (20)$$

(C) Forming the ratio $$\frac{B[\Delta C_t(\sqrt{D_t t}) - \Delta C_b(\sqrt{D_b t})]}{\Delta C_t(\sqrt{D_t t}) + \Delta C_b(\sqrt{D_b t})} = \quad (21)$$

$$\frac{\frac{2}{3}\frac{L_z^2}{(L_x^2 + L_y^2)}W}{\frac{\Delta M(t)}{M_0}} = $$

$$\frac{2}{3}\frac{L_z^2}{(L_x^2 + L_y^2)}\left(\frac{2}{L_x} + \frac{2}{L_y} + \frac{2}{L_z}\right)\frac{W}{\Delta M}\frac{2M_0(W_{in} - W_{out})}{W_{Glass}}$$

the last expression in Eq. (21) being the ASYM value of Eq. (13).

As a more specific, non-limiting, example, $BM_1$ and ASYM values are determined by the following procedure:

(1) From one or more glass sheets manufactured using the glass-sheet manufacturing process whose asymmetry is to be measured, cut or extract at least 4 square test samples (test pieces) of size 100 mm on each edge. The thickness is set by the target thickness of the glass sheet to be tested.

(2) Accurately measure the initial mass $M_0$ of each test sample just before ion exchange in preparation for tracking the change in mass that occurs as a result of ion exchange. Also measure the sample dimensions $L_x$, $L_y$, and thickness $L_z$ for later use in calculations.

(3) Subject the test samples to an ion exchange process that is identical to or at least similar to that which is to be used on parts manufactured using the glass-sheet manufacturing process whose asymmetry is being measured.

As used in this step, a "similar" ion exchange process means subjecting the test samples to similar conditions of time in the salt bath, temperature of the salt bath, and purity or composition of the salt bath, with the same heating up and cooling down before and after immersion in the salt bath. If any polishing or etching is done before or after ion exchange in the manufactured part, the same should be done to the test sample. The resulting surface compressive stress CS, which can be measured by the optical measurement instrument FSM-6000 by Orihara, or measured by any other means, is preferably within 10% of the highest CS observed on manufactured parts. This implies that the salt bath should be "fresh", i.e. relatively pure, and not contaminated by the exchanged ion. High CS is a sensitive measure of the purity of the salt bath. In order to partly remove the influence of asymmetry of the salt bath itself, half the test samples are preferably placed in one orientation of the salt bath relative to the glass manufacturing orientation and half placed in the opposite orientation (see discussion of extrinsic asymmetry below).

Note that if only ASYM values are of interest, the ion-exchange conditions need not be based on those used or to be used on parts manufactured using the glass-sheet manufacturing process of interest, but can be based on other considerations, e.g., easy of use in a testing setting.

(4) Accurately measure the mass just after ion exchange and after cleaning the sample so that only glass remains in the mass measurement.

(5) After all steps of the ion exchange process are completed, including any cleaning and polishing that is intended for the commercial object of interest, measure the maximum warp of the test sample using any of several instruments capable of measuring surface profiles. An example of one such instrument is the KLA Tencor P16 Profilometer, which uses a stylus. Another example is the Tropel Flatmaster MSP-150, which is a non-contact interferometer. Measure the maximum vertical difference from center to edge or corner. Perform the measurement with the part held horizontally.

If there is a detectable curvature to the part, measure it in the "bowl" orientation (see FIG. 1), i.e. with the center lower than the edges, in order to minimize the influence of gravity. If curvature is not readily detectable then measure both bowl and "dome" (center higher than edges) orientations. If those measurements reveal which orientation corresponds with the bowl shape then use the maximum vertical difference from that measurement, otherwise use the smaller of the two maximum vertical differences for the two orientations. Express the result in, for example, microns.

(6) Apply a correction for the influence of gravity by taking each warp value from the previous step and multiplying by a correction factor of 1.07. This correction factor approximately accounts for the flattening influence of gravity on a bowl-shaped piece of glass of the chosen size.

The correction factor of 1.07 (a 7% increase in warp) has been found to be appropriate over the full range of thicknesses from 1 mm to 0.2 mm for square plates of 100 mm on an edge. Density and Young's modulus also affect the gravity correction but these influences are approximately at the 1% level so they can be ignored. In the dome orientation the correction factor is about 1.13 (a 13% increase in warp). The bowl orientation has less impact from gravity and thus is preferred, although the dome orientation and its correction factor can be used if desired.

(7) For each test sample, calculate the value of $BM_1$ by using a ratio R of thickness to diagonal given by $$R = \frac{L_z}{\sqrt{L_x^2 + L_y^2}}$$

where $L_z$ is the thickness in the expression $$BM_1 = \tfrac{2}{3} W \cdot R^2$$

where W (the warp in microns) is the warp corrected for gravity of step 6. (Note that if only ASYM values are desired, Eq. (13) can be used and a separate calculation of $BM_1$ values need not be performed.)

(8) For each test sample, calculate a native (intrinsic) asymmetry ASYM value using Eq. (12) or Eq. (13) above. The final result is obtained by averaging the ASYM values (and $BM_1$ values, if determined) for the various test samples.

With regard to step (6) of the above procedure, i.e., correction for gravity, it should be noted that there is a trade-off between the sheet size (where larger sheets have more warp) and the impact of gravity on sheet shape (where larger sheets have their shape more influenced by gravity). By keeping the size of the sheet smaller, one also has recourse to various commercial instruments that are capable of highly accurate measurements of the sheet shape. These include the use of interferometry such as the Tropel Flatmaster referred to above. A part size of up to about 200 mm on a side should have an easily detectable warp if there is intrinsic asymmetry in the manufacturing process used to produce the part, and should have little influence of gravity on its shape. Smaller sizes can also be used if the measurement equipment is sensitive enough.

Instead of measuring warp, it may be more convenient to measure an average radius of curvature near the center of the sheet. This radius of curvature C is related to the warp W discussed above by the relation $$W = \frac{1}{2C}\left(\left(\frac{L_x}{2}\right)^2 + \left(\frac{L_y}{2}\right)^2\right) \quad (22)$$

If it is desired to measure the warp or radius of curvature of a larger sheet and obtain the gravity-free result, then an apparatus such as is described in U.S. Pat. No. 7,225,665, entitled "Process and apparatus for measuring the shape of an article", which describes a measurement method that incorporates immersing the sheet in a fluid to approximate neutral buoyancy, may be used.

It should be noted that even a glass sheet manufactured to have no intrinsic asymmetry of its physical properties through the thickness of the sheet will generally have some nonzero warp after being ion exchanged. This can occur through either slight variations in the manufacturing process or slight asymmetry of the ion exchange process itself. Fortunately, intrinsic (native) asymmetry can be separated from extrinsic (random) asymmetry by performing repeated measurements and averaging.

In particular, extrinsic asymmetry produced by the ion exchange process itself can be eliminated by varying the orientation of the glass sheets within the salt bath relative to their orientation during manufacturing. Using "top" and "bottom" to denote the two sides of the manufactured sheet, and "left" and "right" to denote the two possible orientations in a salt bath, ion exchanges can be performed both with the top side facing left and also with the top side facing right. When these are compared, extrinsic asymmetry from the salt bath will tend to make the warp have the same orientation relative to the salt bath (left and right) but it will have a different orientation relative to the manufacturing process (top and bottom). Intrinsic asymmetry from the manufacturing process will always have the same warp orientation relative to the manufacturing process (top and bottom), but as a result of flipping, it will have different orientations relative to the salt bath (left and right). Random warp will have values (typically small) that are random relative to the manufacturing process orientation. Accordingly, when multiple sheets are ion exchanged with both orientations of top and bottom relative to left and right of the salt bath, the sign of the observed warp will flip when the top and bottom sides are exchanged, but not when left and right are exchanged. Averaging will then tie any remaining nonzero value to systematic warp that is intrinsic to the glass prior to ion exchange. That is, averaging will help remove extrinsic warp from the ion exchange process itself and will average over random warp that could arise from the warp measurement gauge or from random (small) variations in the manufacturing process. The choice of how many sheets to average depends on how sensitively the warp can be measured.

Using an eight-step measurement procedure of the type described above with flipping and a typical, commercially-acceptable ion exchange process, $BM_1$ and ASYM values were determined for glass sheets produced by a fusion process and glass sheets produced by a float process. The results are shown in Table 2, where samples 1-9 are fusion glass samples and samples 10-22 are float glass samples. $W_{Glass}$ for the fusion and float samples were 63.88 grams/mole and 63.18 grams/mole, respectively; $W_{in}$ (K$^+$) was 39.09831 grams/mole and $W_{put}$ (Na$^+$) was 22.98977 grams/mole. The column labeled "Corrected Warp" in Table 2 refers to measured warp values corrected for the effects of gravity as described above.

As can be seen in Table 2, the fusion glass had substantially smaller $BM_1$ and ASYM values than the float glass, the average over all of the samples of the $BM_1$ values being ~0.0005 microns for the fusion process and ~0.003 microns for the float process, and the average over all of the samples of the ASYM values being ~240 ppm for the fusion process and ~2080 ppm for the float process. Consequently, the float glass can be expected to exhibit warp problems when used in various applications for chemically-strengthened glass sheets.

Using $BM_1$ and/or ASYM values as a guide, the intrinsic (native) asymmetry of the float process can be reduced so as to minimize its warp problems. Likewise, one or both of these values can be used as a guide to maintain the high level of symmetry of the fusion process. In connection with both processes, the techniques disclosed herein can be used to monitor Z-axis asymmetry during on-going production and/or to track changes in Z-axis asymmetry associated with changes to existing processes. In these ways, thin and large glass sheets with low warp after ion exchange can be produced by achieving and/or maintaining the intrinsic symmetry of the physical properties of the glass through the thickness direction, including its thermal history.

In particular, based on the ASYM and the $BM_1$ metrics disclosed herein, as well as the analysis of the physical processes underlying warp discussed above, novel, low-warp, glass sheets are produced which, in an embodiment, have R values that are less than or equal to $2.5 \times 10^{-4}$ and have ASYM values that are less than or equal to 1,500 ppm ($BM_1$ values (K=⅔) that are less than or equal to 0.002 microns). In other embodiments, the glass sheets have R values that are less than or equal to $2.0 \times 10^{-4}$ and ASYM values that are less than or equal to 1,000 ppm ($BM_1$ values (K=⅔) that are less than or equal to 0.001 microns), while in still further embodiments, the glass sheets have R values that are less than or equal to $1.5 \times 10^{-4}$ and ASYM values that are less than or equal to 500 ppm ($BM_1$ values (K=⅔) that are less than or equal to 0.0005 microns).

For these novel glass sheets, the ASYM and the $BM_1$ values are determined for the sheets in question or test samples taken from the sheets in question, while the R values are for the full sheets. For example, for a glass sheet having a thickness of 0.5 mm, an R value of $2.5 \times 10^{-4}$ corresponds to a sheet diagonal of 2000 mm, an R value of $2.0 \times 10^{-4}$ corresponds to a sheet diagonal of 2500 mm, and an R value of $1.5 \times 10^{-4}$ corresponds to a sheet diagonal of 3333 mm. For a sheet thickness of 0.7 mm, the diagonals are larger, being 2800 mm, 3500 mm, and 4667 mm for R values of $2.5 \times 10^{-4}$, $2.0 \times 10^{-4}$, and $1.5 \times 10^{-4}$, respectively.

In view of their low ASYM ($BM_1$) values, the full sheets exhibit gravity-free warp values (W values) that are less than or equal to 48 mm for the R=$2.5 \times 10^{-4}$, ASYM=1,500 ppm (or $BM_1$=0.002 microns) combination, full sheet W values that are less than or equal to 37.5 mm for the R=$2.0 \times 10^{-4}$, ASYM=1,000 ppm (or $BM_1$=0.001 microns) combination, and full sheet W values that are less than or equal to 33 mm for the R=$1.5 \times 10^{-4}$, ASYM=500 ppm (or $BM_1$=0.0005 microns) combination. Full sheets having such low warp values facilitate handling of the sheets during manufacture and use. The ultimate product also benefits from such reduced warp, especially where the chemically-strengthened glass incorporated in the ultimate product has a large surface area.

A variety of modifications that do not depart from the scope and spirit of the invention will be evident to persons of ordinary skill in the art from the foregoing disclosure. The following claims are intended to cover the specific embodiments set forth herein as well as modifications, variations, and equivalents of those embodiments.

TABLE 1

Representative Calculated Gravity-Free Warp Values for Float Glass

| Lx (mm) | Ly (mm) | Lz (mm) | $(Lx^2 + Ly^2)/Lz^2$ | $R \times 10^3$ | Warp (mm) |
|---|---|---|---|---|---|
| 60 | 44 | 0.5 | 22144 | 6.71 | 0.10 |
| 1910 | 1575 | 1.1 | 5065062 | 0.44 | 22.79 |
| 136 | 170 | 0.8 | 74056 | 3.68 | 0.33 |
| 182 | 237 | 0.8 | 139520 | 2.67 | 0.63 |
| 500 | 500 | 0.5 | 2000000 | 0.71 | 9.00 |
| 2000 | 1500 | 3 | 694444 | 1.20 | 3.13 |
| 2000 | 1500 | 1 | 6250000 | 0.40 | 28.13 |

TABLE 2

Representative ASYM and $BM_1$ Values
For Glasses With and Without Intrinsic (Native) Asymmetry

| Sample Number | Thickness (mm) | ΔM/M0 | Warp (mm) | Corrected Warp (microns) | R | $BM_1$ (microns) | ASYM (ppm) |
|---|---|---|---|---|---|---|---|
| 1 | 0.55 | 0.00393 | 0.0485 | 51.895 | 0.003889 | 0.000523 | 247 |
| 2 | 0.55 | 0.00308 | 0.048 | 51.36 | 0.003889 | 0.000518 | 312 |
| 3 | 0.55 | 0.00461 | 0.059 | 63.13 | 0.003889 | 0.000637 | 256 |
| 4 | 0.55 | 0.00381 | 0.033 | 35.31 | 0.003889 | 0.000356 | 173 |
| | | | | | | Average | 247 |
| 5 | 1 | 0.00202 | 0.014 | 14.98 | 0.007071 | 0.000499 | 254 |
| 6 | 1 | 0.00195 | 0.013 | 13.91 | 0.007071 | 0.000464 | 245 |
| 7 | 1 | 0.00197 | 0.0125 | 13.375 | 0.007071 | 0.000446 | 233 |
| 8 | 1 | 0.00197 | 0.014 | 14.98 | 0.007071 | 0.000499 | 261 |
| 9 | 1 | 0.00201 | 0.0115 | 12.305 | 0.007071 | 0.00041 | 210 |
| | | | | | | Average | 241 |
| 10 | 0.55 | 0.00264 | 0.2245 | 240.215 | 0.003889 | 0.002422 | 1722 |
| 11 | 0.55 | 0.00279 | 0.2855 | 305.485 | 0.003889 | 0.00308 | 2070 |
| 12 | 0.55 | 0.00287 | 0.2705 | 289.435 | 0.003889 | 0.002918 | 1908 |
| 13 | 0.55 | 0.00292 | 0.242 | 258.94 | 0.003889 | 0.002611 | 1676 |
| 14 | 0.55 | 0.00288 | 0.304 | 325.28 | 0.003889 | 0.00328 | 2137 |

TABLE 2-continued

Representative ASYM and BM$_1$ Values
For Glasses With and Without Intrinsic (Native) Asymmetry

| Sample Number | Thickness (mm) | ΔM/M0 | Warp (mm) | Corrected Warp (microns) | R | BM$_1$ (microns) | ASYM (ppm) |
|---|---|---|---|---|---|---|---|
| 15 | 0.55 | 0.00308 | 0.2715 | 290.505 | 0.003889 | 0.002929 | 1784 |
| 16 | 0.55 | 0.00278 | 0.2515 | 269.105 | 0.003889 | 0.002713 | 1828 |
|  |  |  |  |  |  | Average | 1875 |
| 17 | 1.1 | 0.001194 | 0.072 | 77.04 | 0.007778 | 0.003107 | 2467 |
| 18 | 1.1 | 0.001383 | 0.0845 | 90.415 | 0.007778 | 0.003647 | 2499 |
| 19 | 1.1 | 0.001414 | 0.081 | 86.67 | 0.007778 | 0.003496 | 2343 |
| 20 | 1.1 | 0.001459 | 0.0785 | 83.995 | 0.007778 | 0.003388 | 2200 |
| 21 | 1.1 | 0.001305 | 0.0765 | 81.855 | 0.007778 | 0.003301 | 2397 |
| 22 | 1.1 | 0.001386 | 0.067 | 71.69 | 0.007778 | 0.002891 | 1976 |
|  |  |  |  |  |  | Average | 2314 |

What is claimed is:

1. A method for measuring the asymmetry of a glass-sheet manufacturing process comprising:
   (I) producing a glass sheet using the glass-sheet manufacturing process;
   (II) measuring the mass $M_0$ of the glass sheet or a test sample from the glass sheet;
   (III) subjecting the glass sheet or the test sample to an ion-exchange process;
   (IV) measuring the change in mass ΔM of the glass sheet or the test sample as a result of step (III);
   (V) measuring a warp value W for the glass sheet or the test sample after step (III); and
   (VI) computing an ASYM value for the glass sheet or the test sample using an equation of the form:

$$ASYM = \frac{2R^2}{3}\left(\frac{2}{L_x} + \frac{2}{L_y} + \frac{2}{L_z}\right)\frac{W}{\Delta M}\frac{2M_0(W_{in} - W_{out})}{W_{Glass}}$$

where $W_{Glass}$ is the molecular weight in grams/mole of the glass making up the glass sheet or the test sample prior to step (III), $W_{in}$ and $W_{out}$ are, respectively, the molecular weights in grams/mole of the ions being exchanged into and out of the glass in step (III), taken singly and not as oxides, R is the glass sheet's or the test sample's thickness-to-diagonal ratio, and $L_x$, $L_y$, and $L_z$ are, respectively, the length, width, and thickness of the glass sheet or the test sample in the same units as the warp value W;
wherein the ASYM value calculated in step (VI) is a measure of the asymmetry of the glass-sheet manufacturing process.

2. The method of claim 1 wherein the warp value of step (V) is determined for the glass sheet or the test sample in a bowl configuration.

3. The method of claim 1 wherein the warp value of step (V) is corrected for the effects of gravity.

4. The method of claim 1 wherein the ASYM value computed in step (VI) is an average value based on measurements made on multiple glass sheets or multiple test samples.

5. The method of claim 4 wherein:
   (a) step (III) comprises submerging multiple glass sheets or multiple test samples in a salt bath;
   (b) each glass sheet or each test sample has a first side and a second side;
   (c) the multiple glass sheets or multiple test samples are submerged in the salt bath with some of the first sides oriented in a first direction and some of the first sides oriented in a second direction, which is opposite to the first direction; and
   (d) the average value computed in step (VI) includes ASYM values for glass sheets or test samples oriented in the first direction and glass sheets or test samples oriented in the second direction.

6. A method for producing low warp, ion-exchanged, glass sheets comprising:
   (a) producing a population of glass sheets using a glass-sheet manufacturing process, each glass sheet in the population having an R value that is less than or equal to $2.5 \times 10^{-4}$, where the R value is the ratio of the thickness of the glass sheet to the length of the glass sheet's diagonal; and
   (b) ion exchange strengthening the population of glass sheets produced in step (a);
wherein the glass-sheet manufacturing process has an ASYM value that is less than or equal to 1,500 ppm, where the ASYM value is determined using the method of claim 4.

7. The method of claim 6 wherein:
   (a) the R value of the glass sheets is less than or equal $2.0 \times 10^{-4}$ and the ASYM value of the glass-sheet manufacturing process is less than or equal to 1,000 ppm; or
   (b) the R value of the glass sheets is less than or equal $1.5 \times 10^{-4}$ and the ASYM value of the glass-sheet manufacturing process is less than or equal to 500 ppm.

8. A method for measuring the asymmetry of a glass-sheet manufacturing process comprising:
   (I) producing a glass sheet using the glass-sheet manufacturing process;
   (II) subjecting the glass sheet or a test sample from the glass sheet to an ion-exchange process;
   (III) measuring a warp value W for the glass sheet or the test sample after step (II); and
   (IV) computing a BM$_1$ value for the glass sheet or the test sample using an equation of the form:

$$BM_1 = K \cdot W \cdot R^2$$

where K is a constant and R is the glass sheet's or the test sample's thickness-to-diagonal ratio;
wherein the BM$_1$ value calculated in step (IV) is a measure of the asymmetry of the glass-sheet manufacturing process.

9. The method of claim 8 wherein the warp value of step (III) is determined for the glass sheet or the test sample in a bowl configuration.

10. The method of claim 8 wherein the warp value of step (III) is corrected for the effects of gravity.

11. The method of claim 8 wherein the $BM_1$ value computed in step (IV) is an average value based on measurements made on multiple glass sheets or multiple test samples.

12. The method of claim 11 wherein:
(a) step (II) comprises submerging multiple glass sheets or multiple test samples in a salt bath;
(b) each glass sheet or each test sample has a first side and a second side;
(c) the multiple glass sheets or multiple test samples are submerged in the salt bath with some of the first sides oriented in a first direction and some of the first sides oriented in a second direction, which is opposite to the first direction; and
(d) the average value computed in step (IV) includes $BM_1$ values for glass sheets or test samples oriented in the first direction and glass sheets or test samples oriented in the second direction.

13. The method of claim 11 where $K=\frac{2}{3}$.

14. A method for producing low warp, ion-exchanged, glass sheets comprising:
(a) producing a population of glass sheets using a glass-sheet manufacturing process, each glass sheet in the population having an R value that is less than or equal to $2.5 \times 10^{-4}$, where the R value is the ratio of the thickness of the glass sheet to the length of the glass sheet's diagonal; and
(b) ion exchange strengthening the population of glass sheets produced in step (a);
wherein the glass-sheet manufacturing process has a $BM_1$ value that is less than or equal to 0.002 microns, where the $BM_1$ value is determined using the method of claim 13.

15. The method of claim 14 wherein:
(a) the R value of the glass sheets is less than or equal $2.0 \times 10^{-4}$ and the $BM_1$ value of the glass-sheet manufacturing process is less than or equal to 0.001 microns; or
(b) the R value of the glass sheets is less than or equal $1.5 \times 10^{-4}$ and the $BM_1$ value of the glass-sheet manufacturing process is less than or equal to 0.0005 microns.

\* \* \* \* \*